United States Patent [19]

Nishiwaki et al.

[11] Patent Number: 4,569,588
[45] Date of Patent: Feb. 11, 1986

[54] LIGHT FREQUENCY CHANGE DETECTING METHOD AND APPARATUS

[75] Inventors: Yoshikazu Nishiwaki; Yozo Nishiura, both of Osaka, Japan

[73] Assignee: Sumitomo Electric Industries Ltd., Osaka, Japan

[21] Appl. No.: 486,515

[22] Filed: Apr. 19, 1983

[30] Foreign Application Priority Data

Apr. 20, 1982 [JP] Japan ................................. 57-66584

[51] Int. Cl.⁴ ............................................. G01P 3/36
[52] U.S. Cl. ................... 356/28.5; 356/346; 356/349; 343/9 PS
[58] Field of Search ...................... 356/28.5, 349, 346; 343/9 PS; 324/77 C, 77 CS

[56] References Cited

U.S. PATENT DOCUMENTS 3,984,190 10/1976 Barrett et al. .................. 356/346

Primary Examiner—S. C. Buczinski
Assistant Examiner—Linda J. Wallace
Attorney, Agent, or Firm—Cushman, Darby & Cushman

[57] ABSTRACT

A method and apparatus for detecting a frequency change of a light modulates the scattered light from the object of measurement using an acousto-optic modulator or the like, heterodyne-detects the scattered light after modulation to provide an electrical signal having a frequency ($f_d - f_m$) which is the difference between the Doppler frequency $f_d$ and the modulation frequency $f_m$, passes this electrical signal to a filter while changing the modulation frequency $f_m$, and obtains the modulation frequency $f_m$ at which the signal voltage is the largest or the smallest, that is, the Doppler frequency $f_d$.

13 Claims, 5 Drawing Figures

LIGHT FREQUENCY CHANGE DETECTING METHOD AND APPARATUS

BACKGOUND OF THE INVENTION

The present invention relates to a method and apparatus for detecting a frequency change of a light.

A technique for detecting a frequency change of a light is necessary in, for example, a velocity meter utilizing the Doppler effect. In general, detection of a frequency change of a light is accomplished by receiving both a light with a changed frequency and a light with an original frequency using the same detector, performing heterodyne detection of them, and reading the change in the frequency using a frequency analyzer such as a spectrum analyzer.

FIG. 1 illustrates a schematic construction of a conventional optical fiber laser Doppler velocity meter. In a laser Doppler velocity meter when a laser beam of frequency $f_o$ strikes a moving object 34, a frequency of the light scattered therefrom is shifted by frequency $f_d$ from an original frequency $f_o$ of the incident light by the Doppler effect. The shift $f_d$ in frequency is called the Doppler frequency. The Doppler frequency $f_d$ is given by the following formula:

$$f_d = \frac{1}{2\pi} (\vec{K_s} - \vec{K_o}) \vec{V} \quad (1)$$

where,
$\vec{V}$: velocity vector of the moving object 34
$\vec{K_o}$: velocity vector of incident light
$\vec{K_s}$: velocity vector of scattered light The velocity V of the object 34 can be obtained by measuring the Doppler frequency $f_d$. A velocity meter utilizing Doppler effect and using optical fibers as light transmission lines and a signal pickup probe is called "Optical Fiber Laser Doppler Velocity meter".

In FIG. 1, a laser 30 is a He—Ne laser having a wavelength of 632.8 nm. A light beam from the laser 30 is guided to a light probe 32 and an avalanche photo diode 35 through a beam splitter 31. The light probe 32 comprises an optical fiber having a refractive index distribution type micro lens 33 mounted at an end. The micro lens 33 is 1-2 mm in diameter and 5-6 mm in length. Most of the light guided within the light probe 32 is emitted out of the light probe as a substantially nondivergent light beam so as to focus in the forward direction of the light probe. This light strikes a moving object of measurement 34. The object 34 scatters the light. The scattered light is shifted in frequency by the Doppler effect into the frequency $(f_o + f_d)$. The light probe 32 picks up a portion of the scattered light.

On the other hand, the light Fresnel-reflected at the end of the light probe is used as a reference light having the original frequency $f_o$. The scattered light $(f_o + f_d)$ and the reference light $(f_o)$ return within the light probe 32 and are guided into the avalanche photo diode 35 through the beam splitter 31 and the optical fiber. The avalanche photo diode 35 performs heterodyne detection of the scattered light $(f_o + f_d)$ and the reference light $(f_o)$. An output signal of the heterodyne detection has frequency which is equal to beat frequency of the reference light and the scattered light, that is, equal to the Doppler frequency $f_d$. The relation of the Doppler frequency $f_d$ with the back-scattered light is obtained by rewriting formula (1) as follows:

$$f_d = \frac{2V}{\lambda} \cos\theta \quad (2)$$

where,
V: velocity of the object of measurement
$\theta$: angle between the light transmitted from the light probe and the velocity direction of the object of measurement
$\lambda$: wavelength of the laser light The frequency $f_d$ is obtained from the signal of a light receiver 36 by a frequency analyzer 37, to thereby determine the velocity V of the object of measurement. In the conventional method for detecting a frequency change of a light, as described above, a frequency analyzer such as a spectrum analyzer is used after heterodyne detection.

However, the spectrum analyzer is an expensive and voluminous apparatus and the detector incorporating such a spectrum analyzer becomes inevitably large in size. Accordingly, there is a need for a detector which is less expensive and smaller in size and which requires no spectrum analyzer.

It is an object of the present invention to provide a light frequency change detecting method which requires no spectrum analyzer.

It is another object of the invention to provide a light frequency change detecting apparatus which can realize a frequency detector which is less expensive and smaller in size.

SUMMARY OF THE INVENTION

In the method and apparatus according to the present invention, the scattered light is modulated using an acousto-optic modulator or the like instead of being subject to heterodyne detection first. The scattered light is, after modulated, heterodyne-detected to provide an electrical signal having a frequency $(f_d - f_m)$ which is the difference between the Doppler frequency $f_d$ and the modulation frequency $f_m$. This electrical signal is passed to a filter while changing the modulation frequency $f_m$, to obtain the modulation frequency $f_m$ at which the signal voltage is the largest or the smallest. The modulation frequency $f_m$ at this time is the Doppler frequency $f_d$.

The present invention will be more fully understood from the detailed description give hereinbelow and the accompanying illustrations which are intended to describe but not limit the scope of the present invention.

DETAILED DESCRIPTION OF THE PREFERRED EMBODIMENTS

Figure 2:
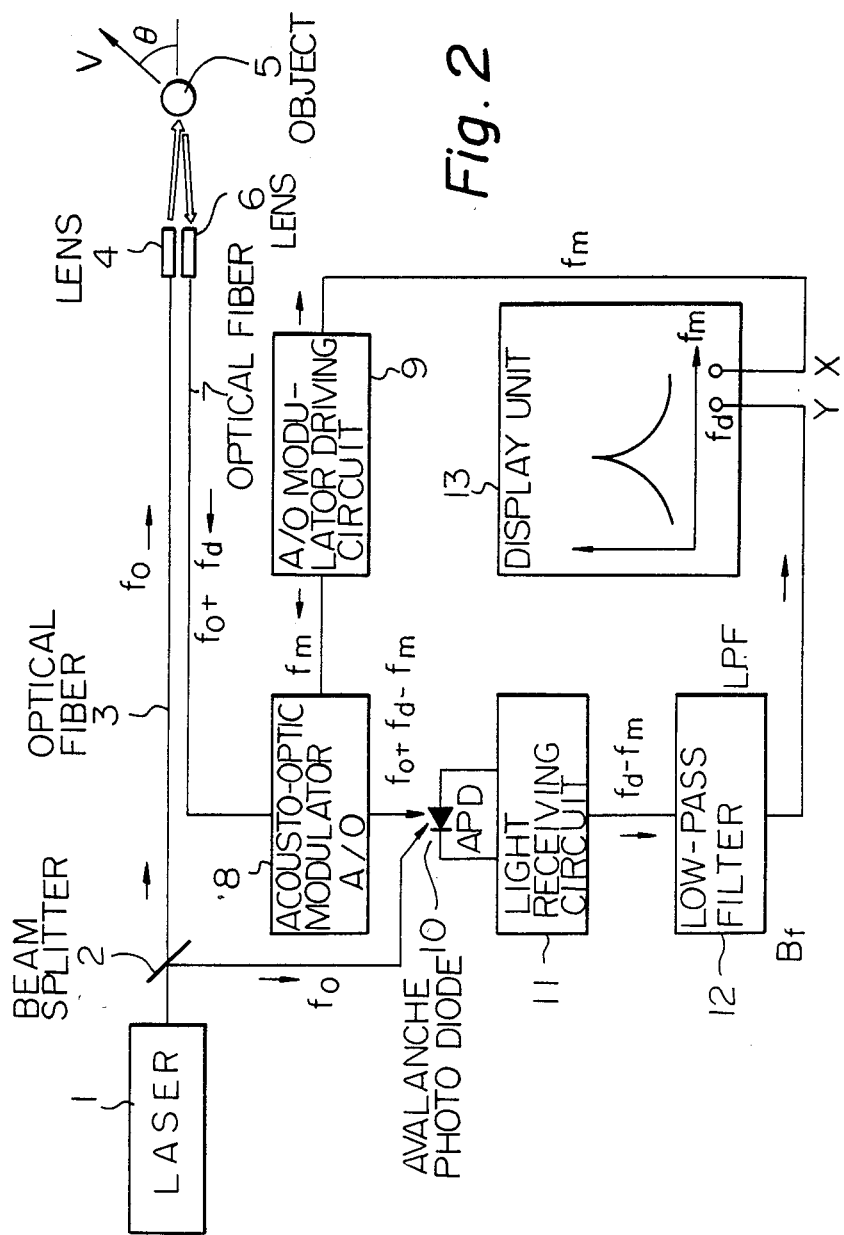
FIG. 2 is a block diagram of an example of the application of the present invention to a laser Doppler velocity meter.

FIG. 2 is a block diagram of a practice in which the method according to the present invention is applied to a laser Doppler velocity meter. A laser 1 is, for example, a He—Ne laser of wavelength 632.8 nm. A laser light of frequency $f_o$ passed through a beam splitter 2, a light transmitting optical fiber 3, and a lens 4, and is incident upon an object of measurement 5. The object 5 is moving at a velocity V at an angle $\theta$ with respect to the direction of incidence. The back-scattered light from the object of measurement has been subject to Doppler shift to have a frequency $(f_o+f_d)$. The back-scattered light is used as a signal light. The signal light returns through a lens 6 and a light receiving optical fiber 7. An acousto-optic modulator 8 modulates the signal light, with the modulation frequency $f_m$ into the signal light having the frequency $(f_o+f_d-f_m)$. An acousto-optic modulator driving circuit 9 oscillates and amplifies the modulation frequency $f_m$ and drives the acousto-optic modulator 8.

The acousto-optic modulator itself is publicly known. When a light is transmitted at an adequate angle through a liquid or solid medium which is transparent to light and through which an ultrasonic wave is propagated and the refractive index of the medium is varied periodically with time, the light is diffracted. At this time, the frequency of the light is shifted by the number of vibrations of the ultrasonic wave. The modulated signal light $(f_o+f_d-f_m)$ and the reference light $f_o$ divided by the beam splitter 2 are incident to an avalanche photo diode 10. Since the avalanche photo diode 10 and a light receiving circuit 11 perform heterodyne detection, an electrical signal having the frequency which is a differences $(f_d-f_m)$ is frequency between the signal light and the reference light is obtained. This electrical signal is passed to a low-pass filter 12. An output of the filter is obtained only when the differential frequency $(f_d-f_m)$ exists in the pass band of the filter.

The acousto-optic modulator driving circuit 9 varies the modulation frequency $f_m$. The modulation frequency $f_m$ is continuously varied to check the amplitude of the output signal of the filter 12. Since the output signal passes through the low-pass filter, when the amplitude of the output signal is the largest, the following equation holds:

$$f_d - f_m = 0 \tag{3}$$

The modulation frequency at this time provides the Doppler frequency. Determination of the modulation frequency $f_m$ at which the amplitude is the largest is made possible simply by using an oscilloscope or the like. A display unit 13 for expressing the modulation frequency $f_m$ in the horizontal axis and the amplitude of the output signal after passage through the filter in the vertical axis is used here. A peak of the curve of $f_m$—amplitude expressed in the display unit 13 provides the Doppler frequency $f_d$.

Figure 3:
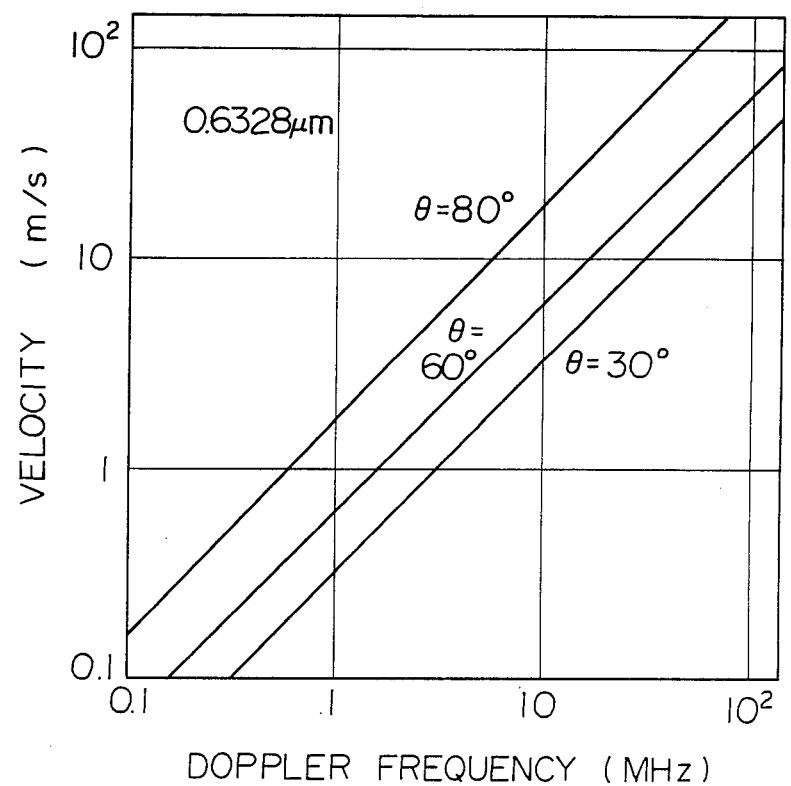
FIG. 3 is a graph showing the relationship between the Doppler frequency and the velocity with the angle $\theta$ between the direction of movement of the object to be measured and the direction of the laser beam as the parameter.

The relationship between the Doppler frequency $f_d$ and the velocity V of the object of measurement has been given hereinabove by formulas (1) and (2). FIG. 3 shows the relationship between the Doppler frequency $f_d$ and the velocity V when the angle $\theta$ is 30°, 60° and 80°, respectively, in a He—Ne laser of wavelength 0.6328 $\mu$m. Since the velocity V is proportional to the Doppler frequency $f_d$, the relationship between $f_d$ and V is expressed by a straight line in a logarithmic graph.

For example, in the case of $\theta=80°$, assuming $f_d=f_m$ at 9 MHz, the velocity V is found to be 16 m/sec. In sweeping the modulation frequency $f_m$, since the display unit 13 clearly showing the relationship between the modulation frequency and the amplitude is used, it is easy to find out the peak amplitude even when the band of the filter 12 is broad.

The acousto-optic modulator 8 has a band extending approximately 10 MHz above and below the central frequency of several tens MHz. However, the band can be easily windened by beam steering or the like method. The range of the velocity that can be measured is increased in the upper and lower limits by the increase in the band of the modulation frequency $f_m$. However, the bank of the low-pass filter 12 is not necessarily widened because the object is to find out the point at which $f_m-f_d=0$. The display unit 13 for detecting the peak amplitude can be done without by evaluating the magnitude of the Doppler frequency $f_m$ simply by presence or absence of the output of the filter 12. In case the band of the low-pass filter 12 is, for example, 1 MHz, the range of error of the detected velocity is ±1 m/sec. When the band of the low-pass filter 12 is 1 KHz, the range of error of the detected velocity is ±1 mm/sec. That is, the measuring accuracy of the velocity is increased by narrowing the band of the low-pass filter 12. The foregoing is the explanation of the application of the method according to the present invention to a Doppler speedometer.

Since the electrical signal $(f_d-f_m)$ is passed to the low-pass filter 12 to detect the peak amplitude, if a frequency characteristic $\eta(\omega_m)$ of the acousto-optic modulator 8 is unusual, it is possible that the frequency characteristic affects the amplitude of the electrical signal $(f_d-f_m)$ and the amplitude of the output of the filter does not assume the peak when $f_d-f_m=0$, as will be described in detail below.

When the signal light $(f_o+f_d-f_m)$ and the reference light $f_o$ are received by the avalanche photo diode 10 and subjected to heterodyne detection, the output is expressed by the following formula:

$$|\eta(\omega_m)E_1 e^{i(\omega_o+\omega_d-\omega_m)t} + E_2 e^{i\omega_o t}|^2 = \eta^2(\omega_m)E_1^2 + E_2^2 + 2\eta(\omega_m)E_1 E_2 \cos(\omega_d-\omega_m)t \tag{4}$$

where, $\eta(\omega_m)$ denotes the frequency characteristic of modulation degree of the acousto-optic modulator, $E_1$ and $E_2$ denote the amplitudes of the signal light and the reference light, respectively, and $\omega_o$, $\omega_d$ and $\omega_m$ denote angular frequencies of the reference light, the Doppler shift and the modulation signal, respectively. A DC component $(\eta^2 E_1^2 + E_2^2)$ is included in the output. While the amplitudes $E_1$ and $E_2$ are constant, the frequency characteristic $\eta(\omega_m)$ varies when the modulation frequency $f_m$ is swept. The band of the low-pass filter is denoted by $B_f$. Then, an AC component $\cos(\omega_d-\omega_m)$ passes the filter when $|\omega_d-\omega_m| < B_f$. Since the characteristic $\eta(\omega_m)$ of the modulator is provided to both the DC component and the AC component, and since the DC component is always larger than the AC component, it is possible that the output of the low-pass filter 12 assumes the largest value for the value $\omega_m$ which makes the value $\eta(\omega_m)$ large.

Figure 4:
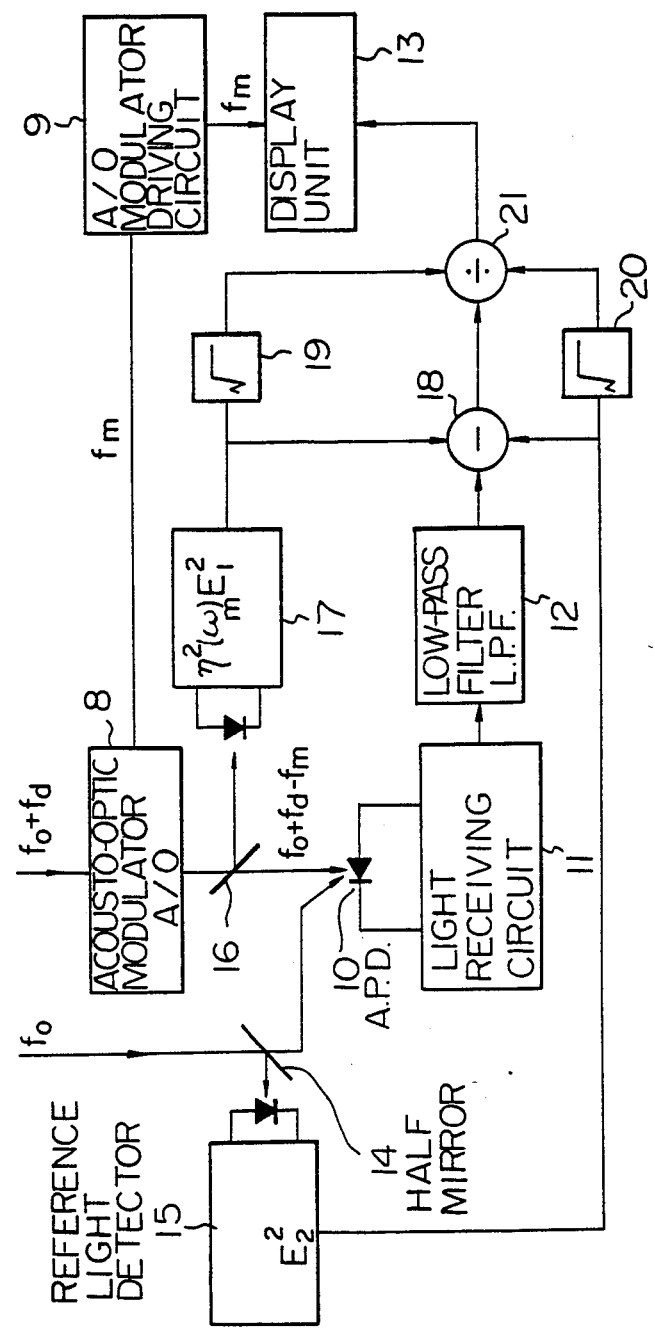
FIG. 4 is a block diagram of another example of the application of the present invention designed to eliminate the frequency characteristic of the modulation degree of an acousto-optic modulator.

In such occasion, a circuit of more refined construction as shown in FIG. 4 is preferred. In the circuit shown in FIG. 4, a half mirror 14 is placed in the passage of the reference light and the intensity $E_2^2$ of the reflected light is detected by a reference light detector 15. A portion of the modulated signal light is taken by a half mirror 16 and the DC component $\eta^2(\omega_m)E_1^2$ of the signal light is detected by a signal light DC component detecting circuit 17. The signal light is, as in the example described above, received by the avalanche photo diode 10 and subjected to heterodyne detection, and the electrical signal of formula (4) appears at the output of the light receiving circuit 11. This electrical signal is passed into the low-pass filter 12. Instead of being displayed directly in the display unit 13, this electrical signal is applied to a subtracting circuit 18 in which the reference light $E_2^2$ and the signal light DC component $\eta^2(\omega_m)E_1^2$ are subtracted from the electrical signal. Accordingly, the DC component is eliminated to leave only the component defined by the following formula (5):

$$2\eta(\omega_m)E_1E_2 \cos(\omega_d\omega_m)t \qquad (5)$$

A square root computing circuit 19 computes the square root of the DC component of the signal light and obtains it as follows:

$$\eta(\omega_m)E_1 \qquad (6)$$

Likewise, a square root computing circuit 20 computes the square root of the reference light intensity to be as follows:

$$E_2 \qquad (7)$$

A dividing circuit 21 divides the formula (5) which is the output of the subtracting circuit 18 by the formulas (6) and (7), to thereby obtain the AC component expressed by the following formula (8):

$$2 \cos(\omega_d - \omega_m)t \qquad (8)$$

This is constant in amplitude and independent from the modulation degree characteristic $\eta(\omega_m)$. That which provides the largest amplitude when displayed in the unit 13 is always $\omega_d - \omega_m = 0$. Therefore, it is made possible to eliminate the error by the modulation degree characteristic $\eta(\omega_m)$ completely. While the example shown in FIG. 4 has been described above as using a low-pass filter, a high-pass filter may be used in place of the low-pass filter.

Figure 5:
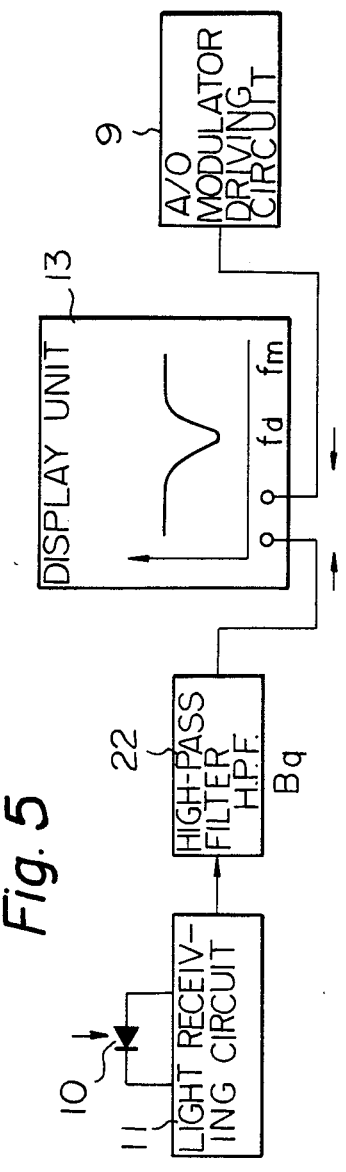
FIG. 5 is a block diagram of an essential portion of an example of the application of the present invention in which a high-pass filter is used.
Figure 1:
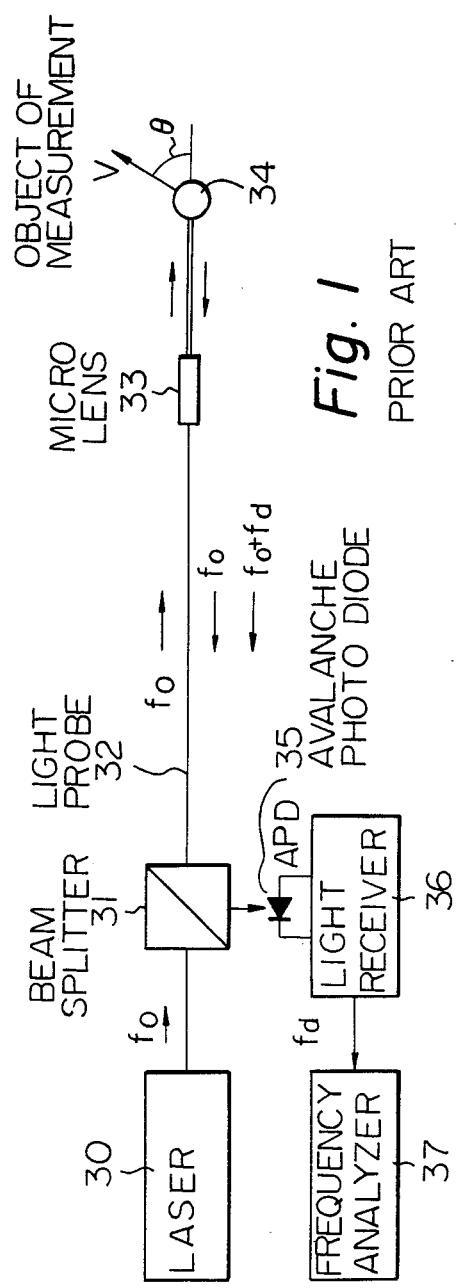
FIG. 1 is a block diagram of a laser Doppler velocity meter in the prior art.

FIG. 5 shows an essential portion of a circuit construction incorporating a high-pass filter 22. An electrical signal including the AC component and DC component of the frequency $(f_d - f_m)$ is applied from the light receiving circuit 11 to the high-pass filter 22. The DC component is completely interrupted while the AC component is allowed to pass the filter 22 when the frequency $(f_d - f_m)$ is larger than the lower limit frequency of the high-pass filter 22. When the frequency $(f_d - f_m)$ is in the blocking band $B_q$ of the high-pass filter 22, both the DC and the AC components are stopped, whereby the filter output is reduced. The filter output is the smallest when $f_d = f_m$.

The method according to the present invention can be applied not only to Doppler velocity meters but also to all cases where it is desired to detect the change in frequency of a light. It is essential that the frequency change $f_d$ of light is addded thereto with the modulation frequency and subjected to heterodyne detection and that the point where $f_m - f_d = 0$ is obtained while varying the modulation frequency $f_m$. The present invention provides a light frequency change detector which is inexpensive and small in size because no spectrum analyzer is required. Further, the present invention is applicable to a laser Doppler velocity meter, a ring laser gyro, and the like.

The invention being best described, it will be obvious that the same may be varied in many ways. Such variations are not to be regarded as a departure from the spirit and scope of the invention and all such modifications as would be obvious to one skilled in the art are intended to be included in the scope of the following claims.

What is claimed is:

1. In a method for detecting a frequency change $f_d$ of a light, in which the light of a frequency $f_o$ is subject to a frequency change $f_d$ into a light signal of a frequency $(f_o + f_d)$, said method being characterized in that the light signal of a frequency $(f_o + f_d)$ is shifted in frequency by modulation frequency $f_m$ by a modulator into a signal light of a frequency $(f_o + f_d - f_m)$, said signal light and a reference light of a frequency $f_o$ are received by a light receiving element and heterodyne-detected to convert an electrical signal, said electrical signal is passed to a filter, and the modulation frequency $f_m$ is continuously swept to find out the modulation frequency $f_m$ at which the amplitude of the filter output is the largest or the smallest, to thereby detect the frequency change $f_d$.

2. A method for detecting a frequency change of a light as set forth in claim 1, wherein the filter is a lower-pass filter and the modulated frequency $f_m$ at which the amplitude of the filter output is the largest is detected.

3. A method for detecting a frequency change of a light as set forth in claim 1, wherein the filter is a high-pass filter and the modulated frequency $f_m$ at which the amplitude of the filter output is the smallest is detected.

4. In a method for detecting a frequency change $f_d$ of a light, in which the light of a frequency $f_o$ is subject to a frequency change $f_d$ into a light signal of a frequency $(f_o + f_d)$, said method being characterized in that the light signal of a frequency $(f_o + f_d)$ is shifted in frequency by modulation frequency $f_m$ by a modulator into a signal light of a frequency $(f_o + f_d - f_m)$, said signal light and a reference light of a frequency $f_o$ are received by a light receiving element and heterodyne-detected to convert an electrical signal, said electrical signal is passed to a filter, a DC component of a light of frequency $f_o$ and a DC component of the shifted signal light are detected to compensate for the influence on a filter output by the frequency characteristic of said modulator, and the modulation frequency $f_m$ is continuously swept to find out the modulation frequency $f_m$ at which the amplitude of said filter output is the largest or the smallest, to thereby detect the frequency change $f_d$.

5. An apparatus for detecting a frequency change $f_d$ of a light, in which the light of a frequency $f_o$ is subject to a frequency change $f_d$ into a light signal of a frequency $(f_o + f_d)$, said apparatus comprising
a light source for generating a light of frequency $f_o$,
a modulator driving circuit for oscillating and amplifying a light of a modulation frequency $f_m$ which can be continuously swept,
a modulator for modulating a frequency shifted light of a frequency $(f_o + f_d)$ by the modulation light of a frequency $f_m$ to output a signal light of a frequency $(f_o + f_d - f_m)$,
a heterodyne detector circuit for receiving said signal light of a frequency $(f_o + f_d - f_m)$ and heterodyne-detecting said signal light using the light of frequency $f_o$ to output an electrical signal of a frequency $f_d-f_m$, a filter with the predetermined band width for passing or blocking said electrical signal, and a detector for detecting the modulation frequency $f_m$ at which the amplitude of the filter output is the largest or the smallest in accordance with the sweep of the modulation frequency $f_m$ by said driving circuit.

6. An apparatus for detecting a frequency charge of a light as set forth in claim 5, said filter comprising a low-pass filter for detecting the modulation frequency $f_m$ at which the amplitude of said filter output is the largest.

7. An apparatus for detecting a frequency change of a light as set forth in claim 5, said filter comprising a high-pass filter for detecting the modulation frequency $f_m$ at which the amplitude of said filter output is the smallest.

8. An apparatus for detecting a frequency change of a light as set forth in claim 5, said detector comprising a display device or an oscilloscope.

9. An apparatus for detecting a frequency change of a light as set forth in claim 5, said modulator comprising an acousto-optic modulator.

10. An apparatus for detecting a frequency change $f_d$ of a light, in which the light of a frequency $f_o$ is subject to a frequency change $f_d$ into a light signal of a frequency $(f_o+f_d)$, said apparatus comprising a light source for generating a light of frequency $f_o$, a modulator driving circuit for oscillating and amplifying a light of a modulation frequency $f_m$ which can be continuously swept, a modulator for modulating a frequency shifted light of a frequency $(f_o+f_d)$ using the modulation light of a frequency $f_m$ to output a signal light of a frequency $(f_o+f_d-f_m)$, a reference light detector for detecting a DC component of the light of a frequency $f_o$, a signal light DC component detecting circuit for detecting a DC component of the modulated signal light, a heterodyne detector circuit for receiving said signal light of a frequency $(f_o+f_d-f_m)$ and heterodyne-detecting said signal light using the light of frequency $f_o$ to output an electrical signal of a frequency $f_d-f_m$, a low-pass filter with the predetermined band width for passing or blocking said electrical signal, an arithmetic circuit for eliminating a DC component of the output of said filter using the outputs from both said reference light detector and signal light DC component detecting circuit and compensating for the influence on the output of said filter by the frequency characteristic of said modulator, and a detector for detecting the modulation frequency $f_m$ at which the amplitude of the filter output is the largest, in accordance with the sweep of the modulation frequency $f_m$ by said driving circuit.

11. An apparatus for detecting a frequency change $f_d$ of a light as set forth in claim 10, said arithmetic circuit including a subtracting circuit, two square root computing circuits, and a dividing circuit.

12. An apparatus for detecting a frequency change $f_d$ of a light as set forth in claim 10, said detector comprising a display device or an oscilloscope.

13. An apparatus for detecting a frequency change $f_d$ of a light as set forth in claim 10, said modulator comprising an acousto-optic modulator.

* * * * *